United States Patent [19]
Pietz

[11] Patent Number: 5,318,323
[45] Date of Patent: Jun. 7, 1994

[54] NON-CLOGGING GAS FILTERING DEVICE

[76] Inventor: John F. Pietz, 10918 E. Singletree Tr., Dewey, Ariz. 86327

[21] Appl. No.: 40,632

[22] Filed: Mar. 31, 1993

[51] Int. Cl.$^5$ .............................................. B60R 21/26
[52] U.S. Cl. .................................... 280/736; 55/445; 55/446; 280/740; 280/742
[58] Field of Search ................. 55/442, 443, 444, 445, 55/446; 280/728 R, 736, 740, 741, 742

[56] References Cited

U.S. PATENT DOCUMENTS

| | | | |
|---|---|---|---|
| 1,824,485 | 9/1931 | Jourdain | 55/446 X |
| 3,807,144 | 4/1974 | Graybill | 55/445 X |
| 4,017,280 | 4/1977 | Cleman et al. | 55/446 X |
| 4,578,247 | 3/1986 | Bolieau | 280/741 X |
| 4,722,551 | 2/1988 | Adams | 280/736 |
| 5,106,119 | 4/1992 | Swann et al. | 280/736 X |

Primary Examiner—Charles Hart

[57] ABSTRACT

A compact filtering device for use in pyrotechnic gas generators comprising of series of small conduits which generally transport the exhaust products from the combustor exit ports to the generator exit ports. Particulate traps (12): which are created by locating the conduit exit ports (11) at some point prior to the conduit end. Particulate traps (12) consisting of entire conduits are created by placing one end (10) of the conduits at a point where the gas stream is forced to make a 90° change in direction and by orienting the longitudinal axis in the direction of the original flow path. Because the traps are then located outside the flow path the particulate, once deposited, will remain in the trap. The device is capable of capturing all of the particulate generated without any change in resistance to gas flow.

11 Claims, 7 Drawing Sheets

NON-CLOGGING GAS FILTERING DEVICE

FIELD OF THE INVENTION

This invention relates to a device capable of removing condensed and particulate matter from a fast moving gas stream. In particular the gas stream created by pyrotechnic gas generators such as those used to inflate the automobile air bag.

DESCRIPTION OF PRIOR ART

Most current pyrotechnic airbag vehicle occupant restraint systems utilize alkali metal azides to generate the gas used to inflate the airbag. A large amount of condensible and particulate matter is generated along with the gas. Much of this matter is caustic and very hazardous. Because most bags have large holes which vent into the vehicle occupant compartment, the particulate must be filtered from the gas stream before it enters the bag. A large variety of filtration devices have been tried with varying degrees of success. Unfortunately most generants burn at over 2000° F. which severely restricts the types of material which can be used for the filtering devices. The filtering devices currently in common use consist of layers of metal screens of various mesh sizes followed by one or more layers of a non-combustible fibrous mat packed between screens. The efficiency of this type of filter is strongly dependant on how tightly the mat is packed; the tighter the mat, the more efficient it is in removing the fine particles. A tightly packed mat, however, causes increased resistance to gas flow and therefore higher operating pressure. In practice the filter ends up being a compromise between maximum efficiency and high pressure. Controlling the mat tightness during the manufacturing process has also proven to be an extremely difficult task. Even though the filters may be wound on the same machine, considerable variability in mat tightness is encountered. This results in significant pressure variations from one unit to another. An additional problem also occurs during the operation of the generator. As matter is trapped, the filter becomes clogged causing an increase in flow resistance and resulting in an increase in back pressure. Since inflators must be constructed to withstand these pressure extremes, current generators are usually much heavier than desired.

Examples of filtering devices which utilize a combination of screens and other materials are described in U.S. Pat. No. 4,322,385 granted Mar. 30, 1982; U.S. Pat. No. 4,017,100 granted Apr. 12, 1977; U.S. Pat. No. 4,296,084 granted Oct. 20, 1981; U.S. Pat. No. 4,005,876 granted Feb. 1, 1977; U.S. Pat. No. 4,012,211 granted Mar. 15, 1977 and U.S. Pat. No. 4,590,041 granted May 20, 1986. None of the described filtering devices remove all of the hazardous particulate from the gas stream. The most efficient of these devices exhibit significant pressure variations, are generally expensive to manufacture, and usually require a heavy gas generator.

An alternate technique used for filtering the particulate from gas streams takes advantage of the difference in inertia between gasses and condensed or particulate matter. Art of this type is disclosed in a number of patents dating back to the 19th century. Albrecht in U.S. Pat. No. 295,322 granted Mar. 18, 1884 claims a spark arrester based on a centrifugal separation. Leising et. al. in U.S. Pat. No. 3,618,980 granted Nov. 9, 1971 and in U.S. Pat. No. 3,618,981 granted on the same date and Buechele-Buecher et. al. in U.S. Pat. No. 4,688,379 granted on Aug. 25, 1987, claim a similar system which causes heavier particles to move to the outside of the confinement where a trap is provided. The filters described in these patents rely on a generally rotational flow pattern forcing a small continuous change in travel direction to cause the heavier particles to move to the outside. The devices of this art are costly, consisting of expensive castings or requiring expensive machining operations. Generally most of the fine particulate is not trapped with this type of device.

Bayles et. al. in U.S. Pat. No. 3,225,526 granted Dec. 28, 1965, Jacobson in U.S. Pat. No. 3,988,888 granted Nov. 2, 1976, and Wilhelm in U.S. Pat. No. 4,158,696 granted Jun. 19, 1979 describe devices which essentially trap particles by causing the combustion products to travel a torturous path. Lette et. al. in U.S. Pat. No. 3,877,882 granted Apr. 15, 1975 in a similar technique employs baffle elements to create a direction change and to cause turbulence in the gas stream to trap a portion of the particulate phase. Bayles et. al. and Wilhelm provide a filtering media within the traps to effect the filtering action. Jacobson creates a torturous path without any filtering media in the trap, however, he and the others provide a filtering media at the very end through which all exhaust products must travel before reaching the generator exit port.

The invention at hand differs from the said prior art in several very important areas:
1. The invention at hand does not utilize any filter media through which the combustion products must travel.
2. The traps of the present invention have only a single opening which serves as both the entrance and exit port.
This requires a change in direction of travel of 180° in order to escape from the trap and thus offers the capability of trapping even the finest particulate.
3. The traps of the present invention are located outside the gas flow path, gas turbulence within the trap is thus avoided.
4. The exit/entrance ports through which the gas must travel do not collect any particulate and therefore do not become clogged.
5. The exit/entrance ports of the present invention can be reproducibly manufactured eliminating the variability in back pressure as now experienced from one unit to another with the other devices.
6. Since the components can be stamped from low cost, thin sheet metal, the current invention affords the capability of producing a low cost, light weight, clean, gas generator.

SUMMARY OF THE INVENTION

In accordance with the teachings of the present invention a filtering device is provided which is capable of removing the particulate matter from a fast moving gas stream. In construction, the device consists of sets of small conduits. A portion of each conduit in some of the sets serves as a duct. Part of the remainder of the conduit functions as a particulate trap. Communication between conduit sets is provided through the exit/entrance ports of the conduits. By locating the entrance port nearer one end of the conduit and the exit port nearer the other end, the combustion products are forced to travel through that portion of the conduit between the ports. The particulate trap is thus created immediately beyond the exit port of each conduit. In some embodiments the entire conduit of some of the sets is used as a particulate trap. Those conduits are normally arranged with one end of the conduit facing the combustor exit ports.

Gas generators of the type used as inflators for the automobile airbag essentially consist of two concentric cylinders. The chamber formed by the inner cylinder normally contains the gas generant and serves as a combustion chamber. The outer chamber which is annular to the combustion chamber serves as the coolant/filtering chamber. It may be divided into one or more subchambers. The units designed for driver protection generally have a large diameter and a short longitudinal axis while those used for passenger protection generally are of a smaller diameter and have a much larger longitudinal axis. For the driver unit, a multiple of gas exit ports are placed circumferentially about the combustion chamber. All ports normally lie in the same plane. The combustor for the passenger unit usually has a number of sets of circumferentially placed ports spaced equally along the longitudinal axis of the combustor. The exit ports on the generator housing are generally arranged in a similarly manner but with the housing exit ports spaced so as not to be in the same axial alignment with the combustor exit ports.

In the present invention the coolant/filter chambers are filled with a plurality of sets of conduits. A set being defined as a plurality of conduits with longitudinal axis all oriented in essentially the same direction and which essentially lie in the same plane or are essentially an equal distance from the combustor wall. Such a set may be formed by placing a corrugated washer between two flat washers or by placing a corrugated wall cylinder between two smooth walled cylinders. A multiple of sets may be formed by spiral winding paired, rectangular corrugated and rectangular flat pieces together. Essentially a pair of cylinders and one set of conduits is formed with each 360° of wrap. Communication ports for a multiple of conduits may be created by cutting slots in the pieces at appropriate places. The washers may have slots cut concentric to and nearer one circumference. Said slots in the flat washers are located an approximately equal distance from the outer circumference as the slots in the corrugated washers are from the inner circumference. Slots for the cylinders are cut parallel to the ends. Slots for the smooth walled cylinders are located some distance nearer and parallel to one end and the slots for the corrugated walled cylinders are located an approximately equal distance from and parallel to the other end. For the spiral wound sets, slots in the corrugated piece are placed parallel to and nearer to one edge and the slots in the flat piece are placed parallel to and nearer the other edge. These slots form a multiple of exit ports for one set of conduits and the entrance ports to the subsequent set.

In operation the combustion products exit the combustor through the combustor exit ports, enter the conduits through the entrance ports. If the entire conduit is a trap, the gas and perhaps some fine particulate will return to the entrance port, exit, change travel direction by 90° and enter the conduits of the first duct set. They will then travel through the conduits until they reach the conduit exit ports. Here they must change direction by 90° to enter a conduit of the next set. The particulate resists the change of direction and enters the trap, loses momentum, and since it must change direction of travel by 180° to escape, it will remain in the trap. The mainly gas entering the conduits of the next set immediately changes direction by 90° and travels through the conduits to the next exit ports. This action is repeated as the gas travels through each subsequent set of conduits until the gas finally reaches the generator exit ports.

DETAILED DESCRIPTION OF THE INVENTION

Figure 1:
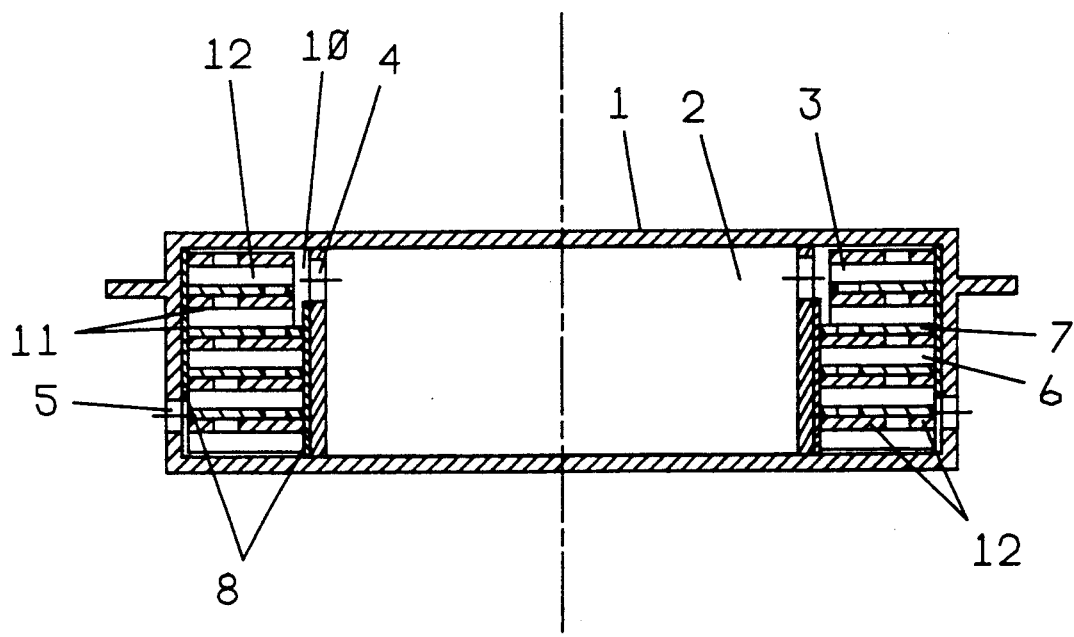
FIG. 1 is a cross-sectional view of an air bag gas generator of the type normally located in the automobile steering wheel well showing an embodiment of this invention.

With reference now to FIG. 1, the gas generator 1 typical of a type employed for the driver unit, showing one embodiment of this invention. The generator includes a combustion chamber 2 with an annular plenum chamber 3. The combustor exit ports 4 consist of a single row of openings circumferentially spaced near one end of the combustor. The generator exit ports 5 are circumferentially spaced in a single row near the opposite end of the generator. The annular chamber 3 is filled with corrugated 6 and flat 7 washers alternated to form the desired sets of conduits. A seal 8 to prevent communication in this region is provided between the ends of the conduits at the outer circumference of the washers and the inside surface of the generator wall. A seal 8 to prevent communication in this region is provided between the ends of the conduits at the inner circumference of the washers and the combustor wall except those conduits in a direct line with the combustor exit ports which must remain unsealed. The inner circumference of the washers forming the conduits which are unsealed may be slightly a larger than that of the other washers.

Upon ignition of the gas generant, the combustion products will exit through the combustor exit ports 4 where they must immediately make a 90° change in direction. The heavier particulate will resist changing direction and continue to travel in a straight line into the open end 10 of the conduits where it will remain in the trap 12. The remaining combustion products now enter the first set of conduits which are sealed at the inner circumference. Here they change direction by 90°, travel through the conduits to the exit ports 11 where another 90° change in direction must again be made. Any particulate remaining in the gas stream will tend to travel beyond the exit ports into the particulate traps 12 located at the end of conduits. The combustion products will travel back and forth through each subsequent set of conduits repeating the described performance until the generator exit ports 5 are reached.

Figure 2:
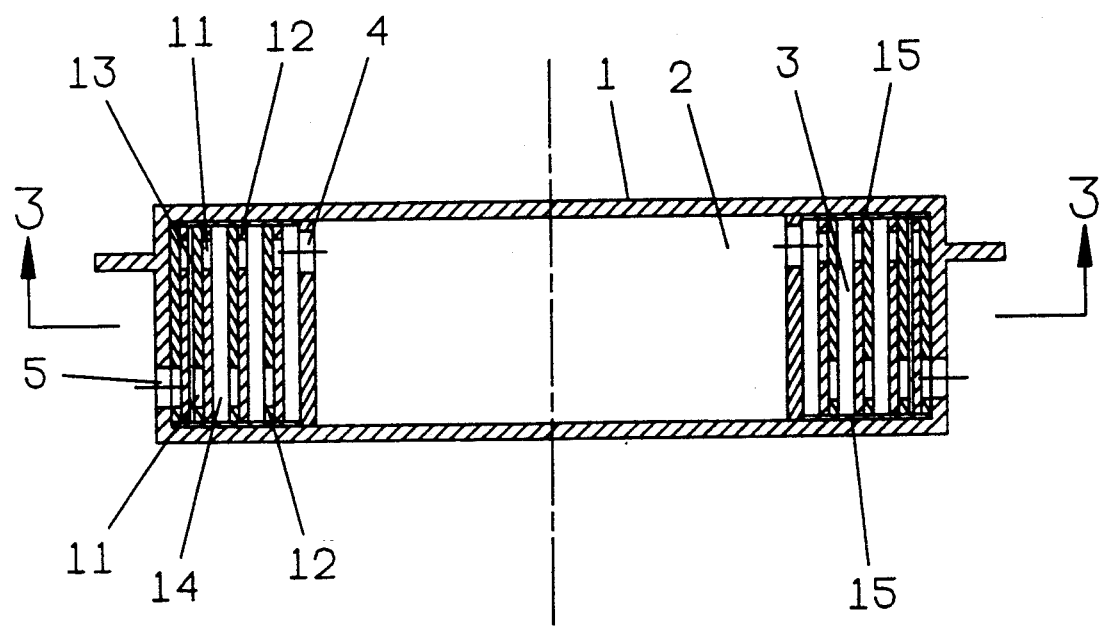
FIG. 2 is a cross-sectional view of an air bag gas generator of the type normally located in the automobile steering wheel showing another embodiment of this invention.

With reference now to FIG. 2, the annular chamber in this embodiment is filled with sets of conduits formed by spiral winding a pair of flat 13 and corrugated 14 rectangular pieces. Seals 15 to prevent communication in this region are provide between the inside surface of the generator and the upper and the lower ends of the conduits.

Upon ignition of the gas generant, the combustion products will flow through the combustor exit ports 4, pass through the entrance ports 11 of the first set of conduits, make a 90° change in direction, travel down the conduits to the exit ports 11 where it will make another 90° change in direction. The heavier particles will resist the change in direction and enter into the traps 12 where they will remain. The products which enter the exit port 11 will have to again make another 90° change in direction and travel up the conduits to the next exit ports 11. The combustion products will travel through each subsequent sets of conduits changing travel direction, depositing particulate, until it at last reaches the generator exit ports 5. The annular chamber 3 in FIG. 2 could also be filled with corrugated 16 and smooth 17 walled concentric cylinders. By alternating smooth 17 and corrugated 16 walled cylinders the desired sets of conduits are also formed.

Figure 3:
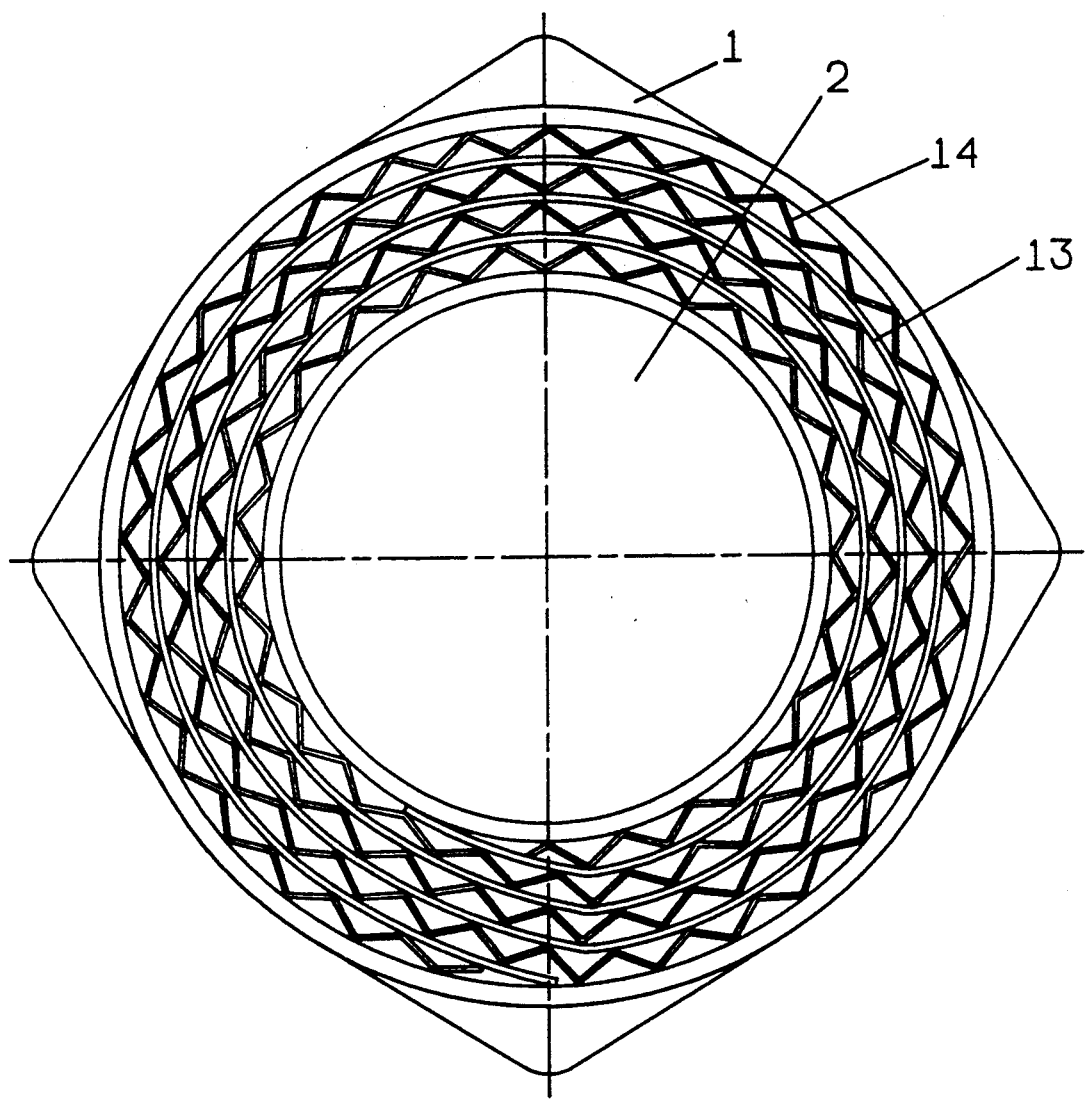
FIG. 3 is a cross-sectional view at A—A.
Figure 4:
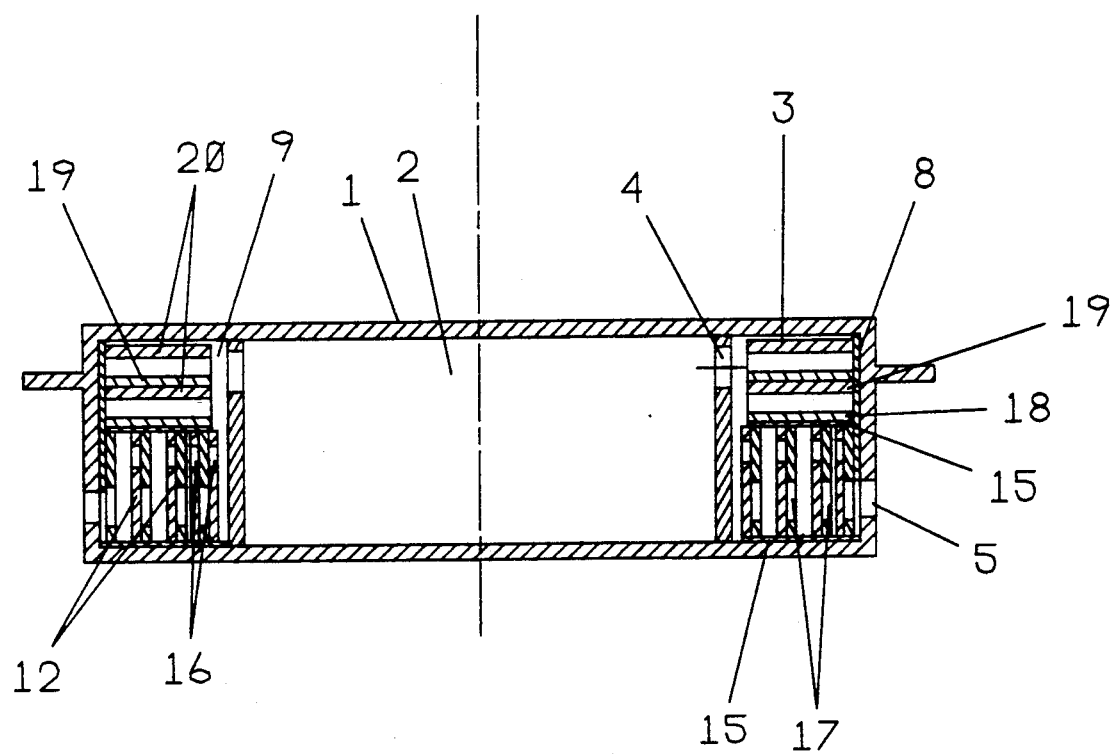
FIG. 4 is a cross-sectional view of an air bag gas generator of the type normally used in the automobile steering wheel well showing yet another embodiment of this invention.
Figure 5:
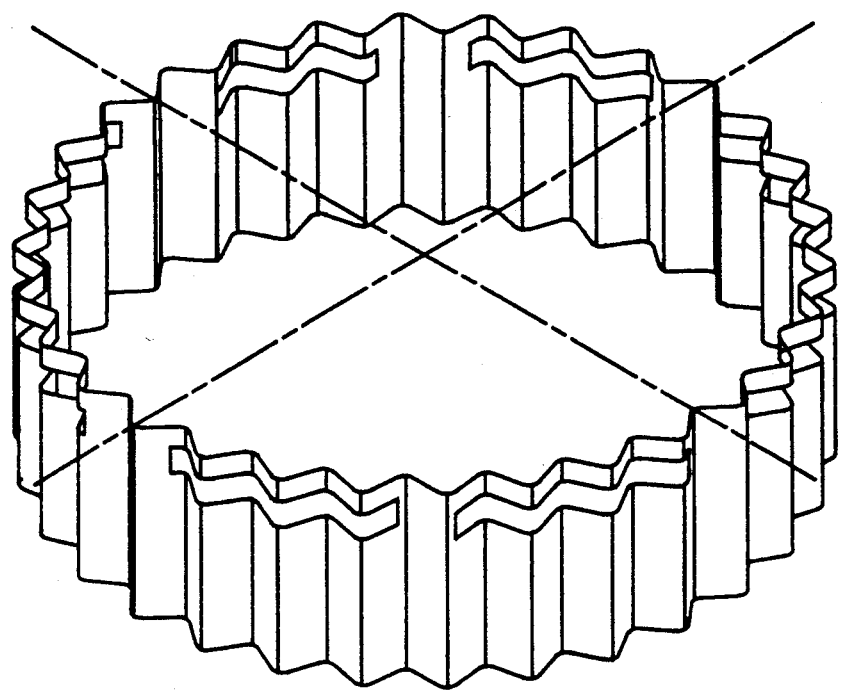
FIG. 5 is a view of a slotted corrugated walled cylinder showing the placement of the slots which create the exit/entrance ports used in one embodiment of this invention.
Figure 6:
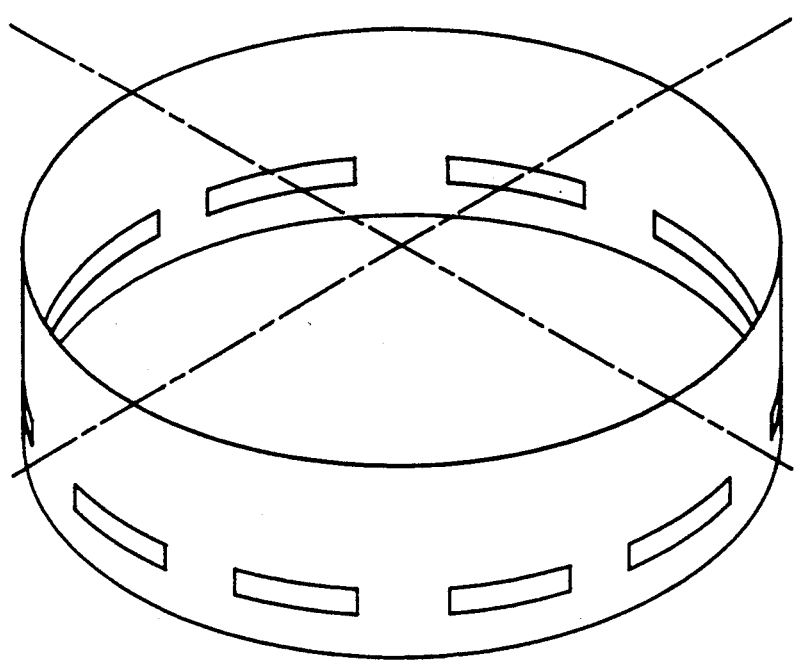
FIG. 6 is a view of a slotted smooth walled cylinder showing the placement of the slots which create the exit/entrance ports used in one embodiment of this invention.
Figure 7:
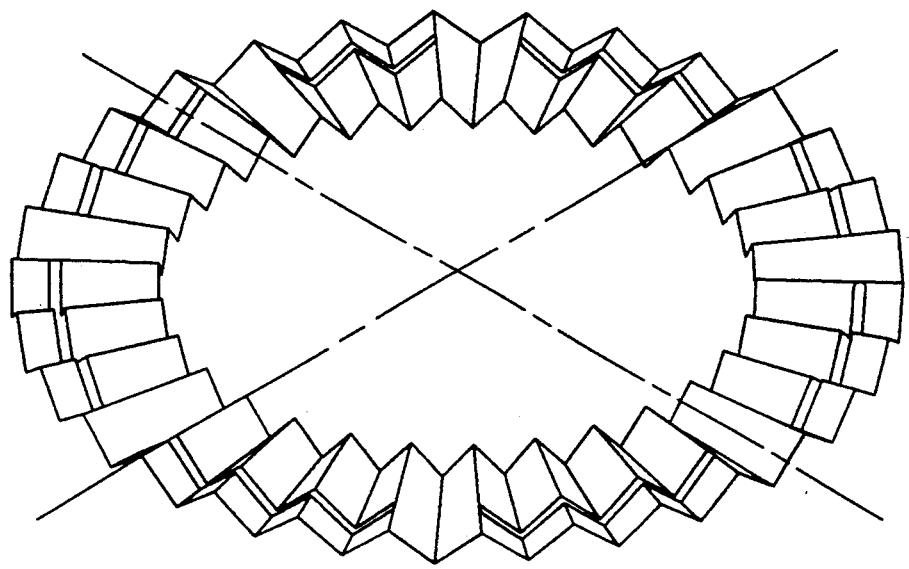
FIG. 7 is a view of a slotted flat washer showing the placement of the slots which create the exit/entrance ports used in one embodiment of this invention.
Figure 8:
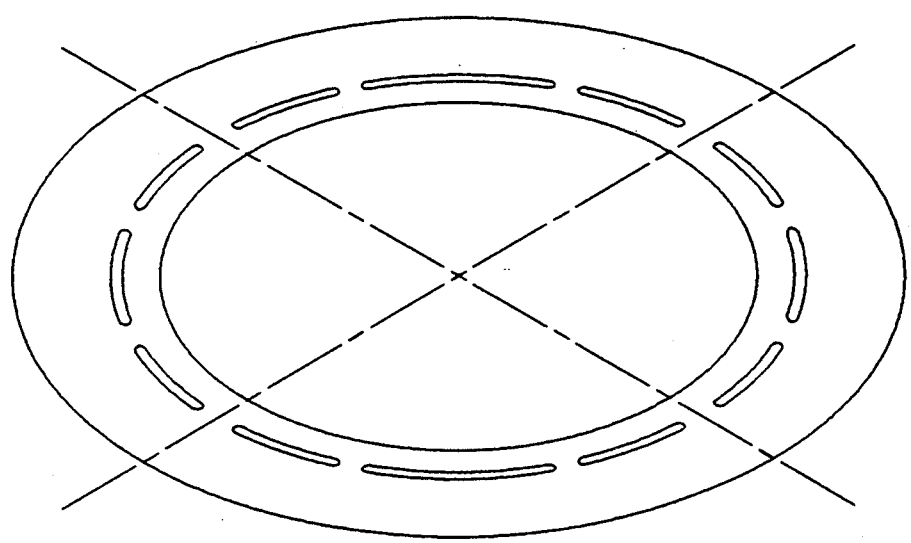
FIG. 8 is a view of a slotted corrugated washer showing the placement of the slots which create the exit/entrance ports used in one embodiment of this invention.
Figure 9:
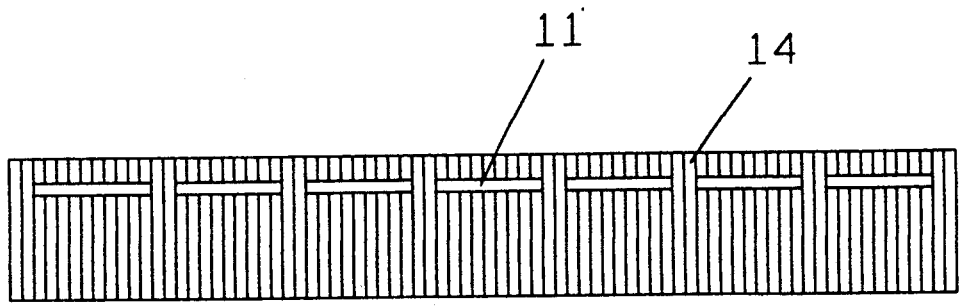
FIG. 9 is a view of a slotted corrugated rectangular piece showing the placement of the slots which create the exit/entrance ports when these pieces are used to form the cylinders of one embodiment or when paired with a slotted flat rectangular piece and spiral wound to form a multiple of sets of conduits in another embodiment.
Figure 10:
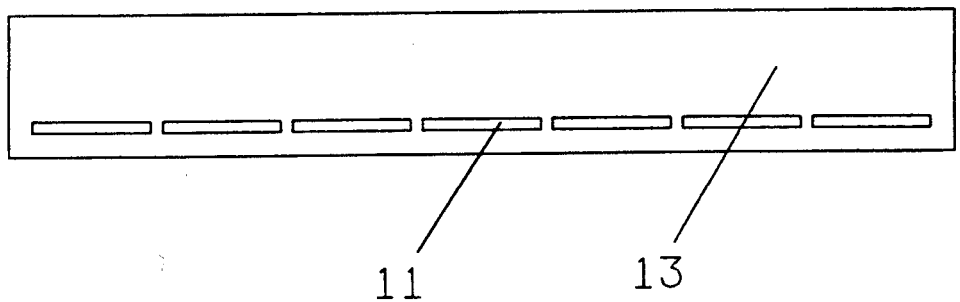
FIG. 10 is a view of a slotted flat rectangular piece showing the placement of the slots which create the exit/entrance ports when these pieces are used to form the cylinders of one embodiment or when paired with a slotted corrugated rectangular piece and spiral wound to form a multiple of sets of conduits in another embodiment.

In yet another embodiment now shown in FIG. 3, the annular plenum chamber 3 is divided into two compartments by a baffle ring 18 positioned at a level just below the bottom of the combustor exit ports 4. The positioning of the baffle 18 forms a small upper compartment and a large lower compartment. The outer circumference of the baffle 18 is sealed at the inner surface of the generator housing. An annular space 9 is provided between the outer surface of the combustor wall and the inner circumference of the baffle 18. The smaller compartment is filled with non-slotted washers 19, 20. There being one less flat washer 19 than corrugated washers 20 with each flat washer 19 placed between two corrugated 20 ones. The inner circumference of the non-slotted washers in this preferred embodiment is equal to that of the inner circumference of the baffle 18. The ends of the conduits in this compartment facing the combustor must remain unsealed. The compartment below the baffle 18 is filled with slotted corrugated 16 and smooth 17 walled concentric cylinders or the essentially cylinders formed by spiral winding a pair of rectangular pieces. The cylinder walls reach from the lower surface of the baffle 18 to the inner surface of the bottom of the generator housing. A seal 15 to prevent communication in this region is provided between the cylinder ends and the baffle 18 and the cylinders ends and the bottom of the generator. All conduits immediately below the annular space 9 formed by the baffle 18 and the combustor wall are unsealed at the upper end. These ends 10 serve as the entry ports 11 to the conduits.

Once the generant in the combustion chamber 2 is ignited, the combustion products will exit through the combustor exit ports 4 traveling radially at near sonic velocity. They must immediately make a 90° change in direction; the heavier particulate however, will continue in a straight line and enter the open ended conduits 10 and remain in the traps 12. The other combustion products now enter the first set of conduits formed by the concentric cylinders, travel to the exit ports 11, change direction by 90° to enter the next set of conduits. The particulate will resist the change in direction and enter the trap. The combustion products will continue to travel through each subsequent set, repeating the performance, until the generator exit ports 5 are reached.

The above description has been made with respect to the preferred embodiments of this invention. It must be recognized however, that various modifications can be made without departing from the spirit and the scope of the appended claims. For example, individual conduits could be fabricated and placed within the chambers in an arrangement similar to the ones described in the embodiments.

I claim:

1. A filtering device capable of removing essentially all particulate matter from the rapidly moving exhaust streams of a pyrotechnic gas generator; said gas generator being generally cylindrial in shape and consisting of a generally cylindrical shaped combustion chamber and a filter chamber annular to said combustion chamber, said combustion chamber having an outlet means consisting of a multiple of perforations placed circumferentially about said combustion chamber, lying in essentially one plane and nearer one end, herein designated as top end, said gas generator having an outlet means consisting of a multiple of perforations placed circumferentially about said gas generator lying in essentially one plane and nearer one end, herein designated as bottom end, said filtering device consisting of a multiple number of sets of small diameter hollow conduits confined, spaced and positioned within said filter chamber to cause said exhaust streams to flow through a multiple of 90 and 180 degree changes of direction;

said conduits comprising a particulate trap or a passageway and a particulate trap;

said set of conduits being formed by placing a radially corrugated washer snugly between two essentially flat surfaces, said flat surfaces being a flat washer or top or bottom surface of said filter chamber, said filter device being created by placing sufficient numbers of flat and corrugated washers to entirely fill said filter chamber, said corrugated washers being separated from each other with said flat washers, said conduits comprising said particulate traps being located in plane with said combustion chamber outlet means, inner circumference of washers used to form said conduits being slightly larger than said combustion camber circumference, and outer circumference of said washers slightly less than filter chamber circumference, said conduits comprising said passageways and particulate traps filling all of remaining filter chamber, said conduits comprising a passageway and a trap having an inlet means located nearer one end for said exhaust stream to enter into, and an outlet means located nearer other end for said exhaust stream to exit therefrom, said inlet and outlet means being perforations located in conduit walls, portion of said conduit located beyond said outlet means being said particulate trap;

a seal being provided between surface of said filter chamber wall and ends of said conduits to prevent communication between said sets in this region, said seal extending from top of filter chamber to top of said gas generator outlet means, a seal provided between surface of said combustion chamber wall and ends of said conduits to prevent communication between said sets of conduits in this region, said seal extending from bottom of said combustion chamber outlet means to bottom of said filter chamber.

2. The filtering device of claim 1 wherein a set of said conduits being formed by placing a radially corrugated washer between two essentially flat surfaces.

3. The filtering device of claim 1 wherein a set of said conduits being formed by placing a radially corrugated washer between two essentially flat washers.

4. The filtering device of claim 3 wherein said corrugated washers having a multiple of elongated perforations essentially concentric to and nearer one circumference and wherein said flat washers having a multiple of essentially equally sized and shaped perforations essentially concentric to and essentially equally nearer opposite circumference.

5. A filtering device capable of removing essentially all particulate matter from the rapidly moving exhaust streams of a pyrotechnic gas generator; said gas generator being generally cylindrical in shape and consisting of a generally cylindrical shaped combustion chamber and a filter chamber annular to said combustion chamber, said combustion chamber having an outlet means consisting of a multiple of perforations placed circumferentially around said combustion chamber lying on one plane nearer one end, herein designated top end, said gas generator having an outlet means consisting of a multiple of perforations placed circumferentially around said gas generator lying in one plane nearer one end, herein designated as bottom end, said filtering device consisting of a multiple number of sets of small diameter hollow conduits confined, spaced and positioned within said filter chamber to cause said exhaust stream to flow through a multiple of 90 and 180 degree changes of direction;

said conduits comprising a passageway and a particulate trap;

said passageways having an inlet means for said exhaust stream to enter into, and an outlet means for said exhaust stream located at or nearer one end of said conduit and said outlet to exit therefrom, said inlet means being a perforation located nearer other end of said conduit, portion of conduit located beyond said passageway outlet means being said particulate trap; longitudinal axis of said conduits extending generally from top to bottom of said filter chamber, said set of conduits being formed by placing a cylinder with vertically corrugated walls snugly between said combustion chamber wall and a smooth walled cylinder, said filter device created by filling said filter chamber with nested smooth walled cylinders and cylinders with vertically corrugated walls, said cylinders concentric to said combustion chamber wall, all cylinders with corrugated walls being separated from each other with a smooth walled cylinder, the conduits formed with each corrugated wall comprising a set, a seal being provided between upper surface of said filter chamber and ends of said conduits to prevent communication between said sets in this region and a seal being provided between surface at bottom of said filter chamber and ends of said conduits to prevent communication between said sets in this region.

6. The filtering device of claim 5 wherein said conduits being formed by placing a cylinder with a corrugated wall between two smooth walled cylinders, ridges and valleys of said corrugations being essentially parallel and extending essentially to ends of said cylinder walls and wherein said corrugated cylinder wall having a multiple of elongated perforations parallel to and nearer one end of said cylinder and wherein said smooth walled cylinders having a multiple of elongated perforations essentially equally sized and shaped located essentially an equal distance from other end of said cylinder.

7. The filtering device of claim 5 wherein a multiple of said sets of conduits being formed by placing a corrugated rectangular sheet on an essentially flat rectangular sheet of essentially equal dimension and spiral winding said sheets within said filter chambers completely filling said filter chamber, ridges and valleys of said corrugations being essentially parallel to ends of said rectangular sheets and wherein said corrugated rectangular sheets having a multiple of elongated perforations essentially parallel to and nearer one side of said corrugated rectangular sheet, and wherein said essentially flat sheets having a multiple of essentially equally sized perforations parallel to and essentially equally distant from opposite side of said essentially flat sheet.

8. A filtering device capable of removing essentially all particulate matter from the rapidly moving exhaust stream of a pyrotechnic gas generator; said gas generator being generally cylindrical in shape consisting of a generally cylindrical shaped combustion chamber and a filter chamber annular to said combustion chamber, said gas generator having an outlet means consisting of a multiple of perforations placed circumferentially about said gas generator lying in one plane near one end, herein designated bottom end, said combustion chamber having an outlet means consisting of a multiple of perforations placed circumferentially about said combustion chamber lying in one plane near one end, herein designated top end, said filter chamber being divided into two compartments by locating a baffle washer in a plane parallel to and slightly below said combustion chamber outlet means, said baffle washer being sealed between outer circumference and inner surface of filter compartment wall to prevent communication with other compartment in this region, inner circumference of said baffle washer being slightly larger than said combustion chamber circumference, said filtering device consisting of a multiple number of sets of small diameter hollow conduits confined, spaced and positioned within said filter chamber compartments to cause said exhaust stream to flow through a multiple of 90 and 180 degree changes of direction; a multiple number of sets of said conduits comprising a particulate trap and a multiple number of sets of said conduits comprising a passageway and a particulate trap, said passageways having an inlet means for said exhaust stream to enter into, and an outlet means for said exhaust stream to exit therefrom, said inlet means being a perforation located at or nearer one end of said conduits and said outlet means being a perforation located nearer other end of said conduit, said particulate trap being portion of conduit located beyond said passageway outlet means;

said filter compartment opposite said combustion chamber outlet means being filled with conduits formed by placing radially corrugated washers between two essentially flat surfaces, flat surface being provided by a washer, baffle washer, or surface of said filter chamber, entire compartment being filled with corrugated washers separated by flat washers, inner circumference of said washers being essentially equal to inner circumference of said baffle washer;

said filter compartment below said baffle washer being filled with groups of conduits comprising a passageway and particulate trap, longitudinal axis of said conduits extending generally from bottom surface of said baffle washer to inner surface of bottom of said filter compartment, said conduits of one said set being formed by placing a cylinder with a vertically corrugated wall snugly between said combustion chamber wall and a smooth wall cylinder; entire filter compartment being filled with vertically corrugated and smooth walled cylinders, corrugated walled cylinders being separated from each other with a smooth walled cylinder, a seal being provided between bottom surface of said baffle washer and ends of said conduits to prevent communication between said sets in this region and a seal being provided between surface of bottom of said filter compartment and ends of said conduits to prevent communication between sets in this region.

9. The filtering device of claim 8 wherein said conduits comprising said traps are formed by placing a radially corrugated washer between two essentially flat surfaces and wherein said conduits comprising said passageways and traps are formed by placing a corrugated walled cylinder between two essentially smooth walled cylinders.

10. The filtering device of claim 9 wherein said conduits comprising said traps being formed by placing a radially corrugated washer between two essentially flat washers and wherein said corrugated cylinder walls having a multiple of elongated perforations parallel to and nearer one end of said cylinder wall and wherein said smooth cylinder walls having a multiple of elongated perforations of essentially equally size and shape located essentially an equal distance from other end of said cylinder wall.

11. The filtering device of claim 8 wherein multiple sets of conduits comprising a passageway and a trap being formed by placing an essentially flat essentially rectangular sheet on a corrugated essentially rectangular sheet of essentially equal dimensions and tightly spiral winding said sheets within said filter chamber from said combustion chamber wall to generator wall, ridges and valleys of said corrugations being essentially parallel to ends of said rectangular sheets, said corrugated rectangular sheets having a multitude of elongated perforations essentially parallel to and nearer one side of said corrugated rectangular sheet and wherein said essentially flat rectangular sheets having a multiple of essentially equally sized perforations parallel to and essentially equally distant from the opposite side of said essentially flat rectangular sheet.

* * * * *